United States Patent
Braun et al.

(10) Patent No.: US 10,208,162 B2
(45) Date of Patent: Feb. 19, 2019

(54) METHOD FOR THE PRODUCTION OF POLYETHER CARBONATE POLYOLS AND DEVICE THEREFOR

(71) Applicant: Covestro Deutschland AG, Leverkusen (DE)

(72) Inventors: Stefanie Braun, Köln (DE); Horst Zwick, Dormagen (DE); Matthias Wohak, Dormagen (DE); Jörg Hofmann, Krefeld (DE); Aurel Wolf, Wülfrath (DE); Michael Traving, Burscheid (DE); Rolf Bachmann, Bergisch Gladbach (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 132 days.

(21) Appl. No.: 15/323,686

(22) PCT Filed: Jun. 30, 2015

(86) PCT No.: PCT/EP2015/064843
§ 371 (c)(1),
(2) Date: Jan. 3, 2017

(87) PCT Pub. No.: WO2016/001221
PCT Pub. Date: Jan. 7, 2016

(65) Prior Publication Data
US 2017/0198092 A1    Jul. 13, 2017

(30) Foreign Application Priority Data

Jul. 3, 2014 (EP) .................................... 14175606

(51) Int. Cl.
| C08G 64/20 | (2006.01) |
| C08G 64/34 | (2006.01) |
| C08G 65/26 | (2006.01) |
| B01J 19/00 | (2006.01) |
| B01J 19/24 | (2006.01) |
| C08G 64/18 | (2006.01) |

(52) U.S. Cl.
CPC ........ *C08G 64/205* (2013.01); *B01J 19/0013* (2013.01); *B01J 19/242* (2013.01); *C08G 64/183* (2013.01); *C08G 64/34* (2013.01); *C08G 65/2603* (2013.01); *C08G 65/2606* (2013.01); *C08G 65/2663* (2013.01); *C08G 65/2696* (2013.01); *B01J 2219/00058* (2013.01); *B01J 2219/24* (2013.01)

(58) Field of Classification Search
CPC .... C08G 64/205; C08G 64/183; C08G 64/34; C08G 65/2696; C08G 65/2606; C08G 65/2603; C08G 65/2663; B01J 19/242; B01J 19/0013; B01J 2219/24; B01J 2219/00058; H05K 999/99
See application file for complete search history.

(56) References Cited

U.S. PATENT DOCUMENTS

| 2013/0211042 A1* | 8/2013 | Gurtler | .................. | C08G 64/34 528/405 |
| 2014/0323670 A1* | 10/2014 | Muller | ................... | C08G 64/34 526/64 |
| 2014/0329987 A1* | 11/2014 | Gurtler | .................. | C08G 64/34 528/366 |

FOREIGN PATENT DOCUMENTS

| EP | 2441788 A1 | 4/2012 |
| EP | 2604641 A1 | 6/2013 |
| WO | WO-2013087583 A1 * | 6/2013 ............. C08G 64/34 |

OTHER PUBLICATIONS

International Search Report and Written Opinion for International Application No. PCT/EP2015/064843, European Patent Office, dated Sep. 14, 2015.

\* cited by examiner

*Primary Examiner* — Robert S Jones
(74) *Attorney, Agent, or Firm* — K&L Gates LLP (57) ABSTRACT

The present invention relates to a method for producing polyether carbonate polyols by addition of one or more alkylene oxides and carbon dioxide to one or more H-functional starter substances in the presence of at least one DMC catalyst, in which the reaction is conducted in a main reactor (8) and a tubular reactor (11, 17) connected as a post reactor downstream thereof, wherein the method is characterized in that at the outlet (13) of the tubular reactor (11, 17) a temperature is set that is at least 10° C. above the temperature in the inside of the main reactor (8). The invention further relates to a device for carrying out said method.

20 Claims, 2 Drawing Sheets

METHOD FOR THE PRODUCTION OF POLYETHER CARBONATE POLYOLS AND DEVICE THEREFOR

CROSS-REFERENCE TO RELATED APPLICATIONS

This application is a U.S. national stage application, filed under 35 U.S.C. § 371, of International Application No. PCT/EP2015/064843, which was filed on Jun. 30, 2015, and which claims priority to European Patent Application No. EP 14175606.4, which was filed on Jul. 3, 2014, the contents of each of which are incorporated by reference into this specification.

FIELD

The present invention relates to a process for preparing polyether carbonate polyols by adding one or more alkylene oxides and carbon dioxide onto one or more H-functional starter substances in the presence of at least one DMC catalyst, in which the reaction is conducted in a main reactor and in a tubular reactor which follows downstream of the latter as postreactor. The invention further relates to an apparatus for performing this process.

BACKGROUND

The preparation of polyether carbonate polyols by catalytic addition of alkylene oxides (epoxides) and carbon dioxide onto H-functional starter substances ("starters") has been the subject of intensive study for more than 40 years (Inoue et al., Copolymerization of Carbon Dioxide and Epoxide with Organometallic Compounds; Die Makromolekulare Chemie 130, 210-220, 1969). This reaction is shown in schematic form in scheme (I), where R is an organic radical such as alkyl, alkylaryl or aryl, each of which may also contain heteroatoms, for example O, S, Si etc., and where e and f are integers, and where the product shown here in scheme (I) for the polyether carbonate polyol should merely be understood such that blocks having the structure shown may in principle be present in the polyether carbonate polyol obtained, but the sequence, number and length of the blocks and OH functionality of the starter can vary, and is not limited to the polyether carbonate polyol shown in scheme (I). This reaction (see scheme (I)) is environmentally very advantageous since this reaction constitutes the conversion of a greenhouse gas such as carbon dioxide ($CO_2$) to a polymer. A further product formed is the cyclic carbonate shown in formula (I) (for example, when R=$CH_3$, propylene carbonate).

(I)

The formation of copolymers from epoxides (e.g. propylene oxide) and carbon dioxide has long been known. For example, U.S. Pat. No. 4,500,704 describes the copolymerization of carbon dioxide and propylene oxide using DMC catalysts. This process is a batchwise process, meaning that catalyst and the entire amount of propylene oxide are introduced prior to commencement of the reaction and contacted with carbon dioxide prior to heating. However, the charging of the autoclave with the entire amount of epoxide results in the drawback that a large amount of propylene oxide is initially charged, which can lead to the release of about 1400 kJ/kg of polymer in the case of a homopolymerization. Such high amounts of heat can be controlled only with difficulty in a stirred tank and thus entail drawbacks from the point of view of reliable operation.

Batchwise mode in the context of this invention is understood to mean that all the reactants, i.e. epoxide(s), any H-functional starter substance(s) and carbon dioxide, are introduced into the reactor prior to commencement of the reaction. In the context of this invention, semi-batchwise mode is understood to mean that at least one of the aforementioned substances is fed to the reactor over a certain period of time.

WO-A 2006/103213 describes, by way of example, a semi-batchwise process where the H-functional starter substance and the catalyst are initially charged and dried in the initial charge. After the catalyst has been activated by adding a portion of the propylene oxide, further propylene oxide is metered continuously into the reactor and the desired $CO_2$ pressure is set. The continuous addition of propylene oxide takes account of an improved safety concept, among other factors. However, one drawback of this mode of operation in conjunction with an autoclave or stirred tank is that, depending on the reactor volume, the fill height of the reactor, the properties of the liquid phase, the composition of the gas phase and further parameters, a variable amount of carbon dioxide in the reactor arises at a preset start pressure and a preset temperature. This means that, during the reaction, the available amount of carbon dioxide at constant temperature is different depending on the aforementioned parameters. In order to keep the pressure constant, further carbon dioxide has to be metered in, in which case solubility effect also have to be taken into account. Moreover, at the start of the reaction, the amount of catalyst present is high at first and then falls continuously in the course of the reaction. These parameters generally affect the product properties. Moreover, it is to be expected that, in this process concept according to the disclosure of WO-A 2008/092767, DMC catalysts exhibit very poor reaction characteristics, or do not show any reaction, with H-functional starter substances of low molecular weight (for example water, propylene glycol, glycerol). Since starter substances of low molecular weight have an inhibiting effect, these can be used only with difficulty, if at all, particularly in the case of batchwise or semi-batchwise processes where the entire amount of H-functional starter substance is initially charged.

WO-A 2008/092767 discloses a process for preparing polyether carbonate polyols by adding alkylene oxides and carbon dioxide onto H-functional starter substances using DMC catalysts, wherein the reactor is initially charged with one or more starter substances of relatively high molecular weight (e.g. polypropylene oxide of molar mass 460 g/mol), and one or more starter substances of low molecular weight (e.g. monopropylene glycol; molar mass 76 g/mol; see example 1) and alkylene oxide are metered continuously into the reactor during the reaction. According to WO-A 2008/092767, the amount of carbon dioxide incorporated into the polymer is dependent on the $CO_2$ pressure in the reactor, a higher $CO_2$ pressure resulting in higher incorporation of carbon dioxide into the polymer. This has the drawbacks that high-pressure apparatuses that are costly to procure are required for industrial scale preparation of polyether carbonate polyols and, at the same time, a complex safety concept has to be provided because of the relatively large gas volume.

A further drawback of the batchwise processes or semi-batchwise processes disclosed in the prior art is the fact that the catalyst first has to be activated (see, for example, WO-A 2008/092767; example 1), which is disadvantageously associated with an additional step and hence causes additional costs.

A further drawback of a stirred tank is the unfavourably low ratio of surface to volume, the effect of which is that the heat released by the polymerization (>1000 kJ/kg of polymer) can be removed via the surface of the reactor only in a relatively inefficient manner, which can have an adverse effect on the control of the reaction temperature. If the removal of heat is undertaken by means of internal or external heat exchangers, this has the drawback that the procurement of a heat exchanger leads to higher investment in the plant and hence to higher costs. If adequate removal of heat and hence an optimal temperature of the reaction mixture is not established, this can lead to an unfavorable selectivity of the reaction or to loss of catalyst activity. Furthermore, an excessive temperature can result both in destruction of the product and in irreversible deactivation of the catalyst. If the removal of heat in a stirred tank reactor is inadequate, the possible high reaction rate of the highly active DMC catalysts cannot be exploited in full, meaning that there is limitation of the maximum reaction rates because of the limited heat removal performance of these reactor types, and there is generally limitation in this regard of reactors both having internal and having external heat exchangers. The consequence is that the reaction can be run only up to a particular alkylene oxide metering rate at constant temperature, even though a higher alkylene oxide metering rate would be achievable on the basis of the high activity of the DMC catalyst.

A further fundamental drawback of a semi-batchwise or batchwise process is that the process has to be stopped for withdrawal of product, therefore resulting in loss of time.

A continuous reaction of alkylene oxides and $CO_2$ can take place in a backmixed reactor (continuous stirred tank) or in a continuous reactor without backmixing. The continuous reactors with backmixing generally feature the same drawbacks as the stirred tanks operated batchwise or semi-batchwise.

WO-A 2007/135154 discloses a reaction unit having a plurality of laminas A, B arranged one on top of another in parallel, which are microstructured in such a way that each lamina has a multitude of channels arranged in parallel to one another, which form a continuous flow pathway from one side of the plate to the opposite side thereof. It can be used for preparation of polyether polyols from one or more alkylene oxides and optionally carbon dioxide and one or more H-functional starter compounds. In order to enable world scale production, it is necessary to implement "numbering-up", which leads to uneconomic production because of the complexity of regulation. In the case of use of a suspended heterogeneous catalyst, for example of a DMC catalyst according to the process of the present invention, however, problems are to be expected with regard to the deposition of catalyst in the microreactor and the plates arranged in parallel, which would lead to blockages in a continuously operated process.

EP 1 448 662 B1 discloses a process in which an apparatus composed of a main reactor with a downstream tubular reactor is used as postreactor for preparation of polyether polyols. By contrast, there is no description of the preparation of polyether carbonate polyols.

SUMMARY

It was therefore an object of the present invention to provide an improved process for preparing polyether carbonate polyols, with which polyether carbonate polyols can be prepared in a high yield and high selectivity with respect to the linear compounds at a comparatively high production rate. Moreover, an apparatus suitable for this purpose is to be provided.

BRIEF DESCRIPTION OF THE DRAWINGS

The invention is elucidated in detail hereinafter by FIGS. 1 to 4 and with the aid of working examples. These figures show.

DETAILED DESCRIPTION

This object is achieved, in a process of the type specified at the outset, in that a temperature at least 10° C. above the temperature within the main reactor is set at the outlet of the tubular reactor.

This solution is surprising, since it is typically to be expected that, in the event of an increase in the reaction temperature, there will be a deterioration in selectivity with regard to the desired linear products in the direction of the cyclic products. The cyclic products are addition products formed from unreacted alkylene oxide and carbon dioxide. Thus, the crude product transferred from the main reactor into the postreactor, according to the process regime, still contains about 3% to 4% by weight of alkylene oxides. These can then react in the postreactor with the carbon dioxide likewise present and the DMC catalysis to give cyclic alkylene carbonates, for example to give cyclic propylene carbonate (cPC) in the case of use of propylene oxide.

A possible further source from which the aforementioned cyclic by-products can arise is linear polyether carbonate polyol that has already formed. Thus, particularly at elevated reaction temperatures, in the presence of the DMC catalyst, there can be what is called "back-biting", in which individual chain members, particularly at the chain ends of the linear polyether carbonate polyol, are detached, and can then react in turn to give cyclic alkylene carbonates.

The formation of the cyclic compounds is undesirable for most end uses of the polyether carbonate polyols. Moreover, this reduces the yield of the desired polyether carbonate polyols, and the economic viability of the process is lower because of the lower exploitation of the reactant streams. The cyclic compounds have to be removed in a complex manner after the reaction, and so it is typically the aim of the reaction regime to minimize the formation of cyclic compounds from the outset. In the context of the present invention, however, it has been found that, contrary to the existing knowledge and expectations of the person skilled in the art, elevated reaction temperatures exclusively in the postreactor do not lead to such a deterioration in selectivity as would be the case if these reaction temperatures were to exist in the main reactor.

The present invention therefore firstly provides a process for preparing polyether carbonate polyols by adding one or more alkylene oxides and carbon dioxide onto one or more H-functional starter substances in the presence of at least one DMC catalyst, in which the reaction is conducted in a main reactor and in a tubular reactor which follows downstream of the latter as postreactor, wherein the process is characterized in that a temperature at least 10° C. above the temperature within the main reactor is set at the exit of the tubular reactor.

In an advantageous configuration of the process of the invention, at the exit of the tubular reactor, a temperature 10 to 40° C. above the temperature within the main reactor, especially 15 to 35° C. above the temperature within the main reactor, is set. This is particularly advantageous since it is possible on the one hand to achieve a comparatively high reaction rate at these temperatures, and the reaction nevertheless proceeds with good selectivity with respect to the linear products.

The main reactor used in accordance with the invention is typically a continuously operated stirred reactor. Typical values for the temperature within the main reactor in the course of operation thereof are 95 to 110° C., especially 100 to 107° C.

In the process of the invention, in addition, it is also possible to set the temperature at the exit of the tubular reactor as a function of the amount of unreacted alkylene oxide at the entrance to the tubular reactor. Specifically, in this case, the temperature can be set at the exit of the tubular reactor in such a way that this temperature, per % by weight of unreacted alkylene oxide measured at the entrance to the tubular reactor, is 2.5 to 12° C. above the temperature within the main reactor, especially 3 to 7° C. per % by weight of unreacted alkylene oxide. In this configuration of the process of the invention too, it is particularly advantageous that it is possible on the one hand to achieve a comparatively high reaction rate at these temperatures, and the reaction nevertheless proceeds with good selectivity with respect to the linear products. The amount of unreacted alkylene oxide can be determined, for example, by means of MIR inline probes.

The procedure for implementation of the higher temperature at the exit of the tubular reactor compared to the main reactor may be such that the temperature at the exit of the tubular reactor is set by means of a heating unit assigned to the tubular reactor or by means of suitable insulation of the tubular reactor. If a heating unit is used, it is appropriately controlled by means of a temperature probe positioned at the exit of the tubular reactor and a suitable associated control unit.

In the case of use of an insulation, it is appropriate to use such an insulation that enables minimum radiation of heat, conduction of heat or release of heat through convection of the tubular reactor. Ideally, an insulation which permits minimum losses of heat to the surroundings is used, such that the postreaction in the tubular reactor can proceed virtually under adiabatic conditions. Such a postreactor is referred to hereinafter as "adiabatic postreactor" for short.

Typical insulation materials have thermal conductivities $\lambda$ within the temperature range of 0-200° C. of 0.03-0.1 W/(mK) (VDI-Wärmeatlas [VDI Heat Atlas], 2013 (DOI 10.1007/978-3-642-19981-3), Section D6.5, p. 674). It is optionally possible to further reduce heat losses with evacuated shells of the tubular reactor. According to VDI-Wärmeatlas, 2013 (DOI 10.1007/978-3-642-19981-3), section E1, p. 721 ff., the heat losses of the insulated tubes and tubular reactors can be calculated according to the equation for multiple concentric tube layers. For example, the heat loss from a pipeline having two insulating layers can be calculated according to $$\frac{\dot{Q}}{l} = \frac{\pi(\vartheta_i - \vartheta_a)}{\frac{1}{\alpha_i d_1} + \frac{1}{2\lambda_1}\ln\left(\frac{d_2}{d_1}\right) + \frac{1}{2\lambda_2}\ln\left(\frac{d_3}{d_2}\right) + \frac{1}{2\lambda_3}\ln\left(\frac{d_4}{d_3}\right) + \frac{1}{\alpha_a d_4}}$$

with $\dot{Q}$ as heat flow, l as length section of the insulated pipeline, with $\alpha_i$ as internal coefficient of heat transfer according to ch. G1 of the VDI Wärmeatlas, $\alpha_a$ as external coefficient of heat transfer with air at rest according to ch. F2 of the VDI Wärmeatlas incorporating the radiation component according to ch. K1 of the VDI Wärmeatlas, $d_1$ as the internal diameter of the inner tube, $d_2$ as the external diameter of the inner tube, $d_3$ as the external diameter of the first, inner insulating layer, $d_4$ as the external diameter of the second, outer insulating layer, $(\vartheta_i - \vartheta_a)$ as the temperature differential between the interior of the inner tube $(\vartheta_i)$ and the outer tube $(\vartheta_a)$, $\lambda_1$ as the local thermal conductivity of the tube material of the inner tube, $\lambda_2$ as the local thermal conductivity of the first, inner insulating layer and $\lambda_3$ as the local thermal conductivity of the second, outer insulating layer.

In order to be able to define the heat losses irrespective of the scale of the process and the temperature level within the tube and the ambient temperature, it is appropriate to base the quotient $$\frac{\dot{Q}}{l}$$

of heat flow and length section determined for the insulated pipeline on the pipe area $A_1$ of the inner tube with diameter $d_1$ ($A_1 = \pi d_1 l$) per length section l and on the temperature differential of the inner tube $(\vartheta_i)$ and outside the outer tube $(\vartheta_a)$. The specific heat losses k are referred to as coefficient of heat transfer and are calculated by the formula:

$$k = \frac{\frac{\dot{Q}}{l}}{\frac{A_1}{l}(\vartheta_i - \vartheta_a)}$$

This method of determination of the heat losses according to VDI-Wärmeatlas, 2013 (DOI 10.1007/978-3-642-19981-3), Section E1, is applied in the present context to a tubular reactor provided with an insulating layer. According to this, depending on the temperature differential between the internal temperature and ambient temperature, insulation material used and pipe diameter, it is possible to achieve coefficients of heat transfer k of 0.1-12 W/(m²K), especially 0.3-12 W/(m²K). A correspondingly insulated tubular reactor has, for example, a coefficient of heat transfer k of not more than 12 W/(m²K), especially of not more than 8 W/(m²K), preferably of not more than 2 W/(m²K), more preferably not more than 0.5 W/(m²K). To attain these coefficients of heat transfer, the tubular reactor may be provided, for example, with an evacuated jacket, similarly to a mirrored glass jacket as also employed in glass columns for distillation purposes. In this case too, it is appropriate, for temperature control, to position a temperature sensor at the exit of the tubular reactor, with the aid of which compliance with the minimum temperature desired can be monitored. Additional heat losses can arise through incorporation of flanges, valves, mounts, distributors and other auxiliary devices.

The design of the tubular reactor in terms of its residence time ensures that the alkylene oxides are fully reacted at the minimum temperature set. Should the temperature go below the minimum temperature, the reaction mixture can be conducted back into the main reactor and operated in circulation mode. It would likewise be possible to correct the mode of operation of the main reactor, for example by lowering the residence time in the main reactor. This circulation mode is of significance particularly for the startup of an adiabatically operated postreactor. By means of circulation mode, the adiabatic postreactor can be brought to the reaction temperature of the main reactor. It is possible in this way to compensate for heat losses from the reaction mixture that result from heating of the reactor components. Only when the tubular reactor has been adequately heated is the mode of operation switched to continuous mode. The advantage of this mode of operation is that costly investments for a heat exchanger for the rare startup operations of a continuously operated tubular reactor are avoided. In addition, installed heating for the startup operations, even in the switched-off state, would entail drawbacks in the form of relatively large heat losses later on in adiabatic operation. Should the maximum permissible temperature at the exit from the tubular reactor be exceeded, the control of the main reactor can likewise be corrected, for example by raising the residence time in the main reactor.

In a further configuration of the process of the invention, the reaction mixture can be fed from the main reactor into the tubular reactor in such a way that the reaction mixture at the entrance to the tubular reactor has a content of unconverted alkylene oxides of 1% to 10% by weight, based on the reaction mixture, especially 2% to 6% by weight, preferably 3% to 4% by weight. This is advantageous because it is possible in this way to feed a reaction mixture that has already been converted for the most part to the tubular reactor, said reaction mixture containing only a small proportion of cyclic compounds by virtue of suitable reaction conduct in the main reactor. Especially in the case of the aforementioned small molar amounts of as yet unreacted starting materials, the tubular reactor can be operated at the elevated temperatures specified in accordance with the invention without any significant increase in the proportion of cyclic compounds.

The tubular reactor used in accordance with the invention is, for example, a heated or thermally jacketed tube. The heater used may be an electrical heater or a heating jacket operated with a heating fluid. It is optionally possible to meter in further amounts of reactants. Particularly DMC catalyst, one or more alkylene oxides and/or carbon dioxide can be fed continuously to the tubular reactor at its opening facing the main reactor, i.e. its inlet. The resulting product consisting essentially of polyether carbonate polyol is then withdrawn continuously at the other end of the tubular reactor (outlet).

The tubular reactor can have a ratio of tube length L to internal tube diameter of the reaction tube $d_R$ of $L/d_R$ 10 to 100. In the case of an adiabatic postreactor, $d_R$ denotes the internal diameter of the inner tube.

The feeds to the mixers and reservoirs and to the main reactor and downstream tubular reactor are preferably heatable, such that it is also possible to use solid or highly viscous H-functional starter substances.

The tubular reactor is preferably manufactured from stainless steel, but it is likewise possible that other materials can also be used, provided that the material is compatible in terms of reactants/products, pressures, etc.

The tubular reactor may either consist of a continuous piece of tube or at least two tubes joined to one another, for example also having different properties, such as different internal diameter. The internal diameter of the tubular reactor may be the same over the entire length or different. The internal diameter of the tubular reactor is preferably from 1.1 mm to 900 mm. For example, the tubular reactor, in a first subsection that extends over 20% to 60% of its total length, has an internal diameter of 1.1 mm to <100 mm and, over a second subsection that follows downstream of the first subsection, and which extends over 80% to 40% of its total length, an internal diameter of 100 mm to 500 mm, preferably of 100 mm to 250 mm.

The tubular reactor may also consist of two or more reaction tubes that run in parallel. It is generally advantageous to use industrially standard embodiments, for example shell and tube heat exchangers. A significant advantage of tubes arranged in parallel is that higher flow rates can be achieved in the reaction tube. The latter improves heat transfer, and is thus a preferred design in a heated version of the tubular reactor.

Preferably, in the process of the invention, mean residence times in the tubular reactor of 0.5 minute to 6 hours, preferably of 1 minute to 4 hours, more preferably 1 minute to 60 minutes, are established. The mean residence time can be determined from the ratio between volume flow rate and reactor volume, the latter being calculated from the internal diameter of the tube(s) and the length of the tube or the length of the individual tube sections. In the case of residence times that are too short, the conversion is generally incomplete, and an excessively long residence time is generally disadvantageous in relation to space-time yield and thus makes the process less viable.

In the case that a heated version of the tubular reactor is chosen, it is advantageous to set the volume flow rate such that a turbulent flow profile (dimensionless Reynolds number greater than 2300) is established. If the tubular reactor is operated in an adiabatic manner, low Reynolds numbers in the laminar or transition range (<2300) are preferable.

If the tubular reactor consists of at least two tubes joined to one another, it is possible to set these to different temperatures (for example by heating or cooling).

It is also possible in principle to provide the tubular reactor with a plurality of addition points along its longitudinal extent, such that it is possible to add alkylene oxide or a mixture of two or more alkylene oxides and H-functional starter substances or a mixture of H-functional starter substances at various points in the reactor. This makes it possible to produce block copolymers.

Preferably, a tubular reactor having an internal diameter of 1.1 mm to 250 mm can be operated without internals. Preferably, a tubular reactor having an internal diameter of >250 mm to 500 mm may contain one or more static mixers or a combination of static mixers and heat exchangers (for example cooling coils).

In the process of the invention, it is possible to use DMC catalysts without prior activation steps (in the presence or absence of carbon dioxide). This has the advantage over a batchwise or semi-batchwise process in stirred tanks that a prior time-consuming and costly activation step for the DMC catalyst can be dispensed with. In principle, however, it is also possible first to activate the DMC catalyst in a preceding step and then to use it in the process of the invention. The preceding step for activation of the DMC catalyst can be effected in a reactor connected upstream of the main reactor, which may itself in turn be a tubular reactor or a stirred tank.

Activation of the DMC catalyst refers to a step in which a portion of the alkylene oxide, optionally in the presence of $CO_2$, is added to the DMC catalyst and then the addition of the alkylene oxide compound is stopped, with observation of a temperature spike ("hotspot") and/or a pressure drop in the reactor because of an exothermic chemical reaction which follows. The process step of activation is the period of time from the addition of the portion of alkylene oxide compound, optionally in the presence of $CO_2$, to the DMC catalyst until the hotspot has abated. In general, the activation step may be preceded by a step for drying of the DMC catalyst and optionally of the starter by means of elevated temperature and/or reduced pressure, this drying step not being part of the activation step in the context of the present invention.

In a further embodiment, the process is a process for preparing polyether carbonate polyols by adding one or more alkylene oxides and carbon dioxide onto one or more H-functional starter substances in the presence of at least one DMC catalyst, characterized in that the addition is conducted in a main reactor and a downstream tubular reactor, wherein
(i) the DMC catalyst is suspended in one or more H-functional starter substances or cyclic propylene carbonate,
(ii) the suspension from (i) is combined with one or more alkylene oxides and with 10 to 200 bar of carbon dioxide, preferably 15 to 180 bar and more preferably 20 to 120 bar of carbon dioxide, and
(iii) the mixture resulting from (ii) is reacted in the main reactor at a temperature of 80 to 150° C., preferably 90 to 135° C., and preferably at a reaction pressure of 10 to 200 bar, more preferably 15 to 180 bar, most preferably 20 to 120 bar,
wherein the pressures set in the tubular reactor are essentially the same pressures as in the main reactor.

Preferably, however, the reactant streams are fed separately into the main reactor and only mixed and reacted with one another therein. In this preferred variant of the process of the invention, the DMC catalyst, the H-functional starter substance, the alkylene oxide and the carbon dioxide are thus fed directly to the main reactor and reacted therein, especially at a temperature of 90 to 135° C. and a reaction pressure of 20 to 180 bar. It is a particularly preferred variant to feed the DMC catalyst as a dispersion in the H-functional starter substance, the alkylene oxide and the carbon dioxide directly to the main reactor.

Reaction pressure is understood to mean the pressure in the main reactor (step iii). This pressure can be controlled, for example, by introducing further carbon dioxide into the main reactor to increase the pressure, or a reduction in pressure can be brought about by means of a valve in the main reactor and/or in the downstream tubular reactor.

If the main reactor and also the postreactor is operated at the reaction pressure specified, this has the advantage that the reactants are in liquid form even at elevated temperature. Moreover, a high pressure brings about higher selectivity and higher incorporation of $CO_2$.

In step (ii), the combination of the individual components can be effected simultaneously or successively, prior to the addition to the main reactor or in the main reactor; "successive combination" of the individual components is understood to mean that
(ii-1) the suspension from (i) is first combined in a first mixer with one or more alkylene oxides and then in a second mixer with 10 to 200 bar, preferably 15 to 180 bar, more preferably 20 to 120 bar, of carbon dioxide, or
(ii-2) the suspension from (i) is first combined in a first mixer with 10 to 200 bar, preferably 15 to 180 bar, more preferably 20 to 120 bar, of carbon dioxide and then in a second mixer with one or more alkylene oxides.

Step (ii) can be conducted at a temperature of 5 to 50° C. This achieves the effect that no polymerization in the mixer sets in because of the relatively low temperature.

In the process, preferably dried (e.g. 50° C. at 100 mbar) DMC catalyst is added as a suspension in one or more H-functional starter substances. Typical concentrations of the DMC catalyst in the catalyst suspension are between 0.1%-50% by weight, preferably 0.1%-25% by weight and more preferably 0.1%-10% by weight, based on the catalyst suspension composed of DMC catalyst and H-functional starter substances. The suspension should in any case be such that it remains conveyable with conventional pumps (e.g. membrane pumps).

It is advantageous to grind the DMC catalyst to a particular particle size prior to use. It has been found that particles smaller than 500 μm are practicable. Smaller particle sizes are even better in principle, in order to avoid blockages.

The polyether carbonate polyols obtained in accordance with the invention can generally have a functionality of, for example, at least 1, preferably of 2 to 8, more preferably of 2 to 6 and most preferably of 2 to 4. The molecular weight is preferably 400 to 10 000 g/mol and more preferably 500 to 6000 g/mol.

In general, it is possible to use alkylene oxides (epoxides) having 2-24 carbon atoms for the process of the invention. The alkylene oxides having 2-24 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, $C_1$-$C_{24}$ esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate and epoxy-functional alkyloxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxysilane. Alkylene oxides used are preferably ethylene oxide and/or propylene oxide, especially propylene oxide.

Suitable H-functional starter substances used may be compounds having hydrogen atoms that are active in respect of the alkoxylation. Groups which have active hydrogen atoms and are active in respect of the alkoxylation are, for example, —OH, —NH$_2$ (primary amines), —NH— (secondary amines), —SH and —CO$_2$H, preferably —OH and —NH$_2$, especially preferably —OH. H-functional starter substances used are, for example, one or more compounds selected from the group consisting of water, mono- or polyhydric alcohols, mono- or polyfunctional amines, polyhydric thiols, carboxylic acids, amino alcohols, aminocarboxylic acids, thio alcohols, hydroxy esters, polyether polyols, polyester polyols, polyester ether polyols, polyether carbonate polyols, polycarbonate polyols, polyethyleneimines, polyetheramines (for example so-called Jeffamines® from Huntsman, for example D-230, D-400, D-2000, T-403, T-3000, T-5000 or corresponding BASF products, for example Polyetheramine D230, D400, D200, T403, T5000), polytetrahydrofurans (e.g. PolyTHF® from BASF, for example PolyTHF® 250, 650S, 1000, 10005, 1400, 1800, 2000), polytetrahydrofuranamines (BASF product Polytetrahydrofuranamine 1700), polyether thiols, polyacrylate polyols, castor oil, mono- or diglyceride of ricinoleic acid, monoglycerides of fatty acids, chemically modified mono-, di- and/or triglycerides of fatty acids, and C$_1$-C$_{24}$-alkyl fatty acid esters containing an average of at least 2 OH groups per molecule. The C$_1$-C$_{24}$ alkyl fatty acid esters containing an average of at least 2 OH groups per molecule are, for example, commercially available products such as Lupranol Balance® (BASF SE), the Merginol® range (Hobum Oleochemicals GmbH), the Sovermol® range (Cognis Deutschland GmbH & Co. KG) and the Soyor®TM range (USSC Co.).

Monofunctional starter compounds used may be alcohols, amines, thiols and carboxylic acids. Monofunctional alcohols used may be: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Useful monofunctional amines include: butylamine, t-butylamine, pentylamine, hexylamine, aniline, aziridine, pyrrolidine, piperidine, morpholine. Monofunctional thiols used may be: ethanethiol, propane-1-thiol, propane-2-thiol, butane-1-thiol, 3-methylbutane-1-thiol, 2-butene-1-thiol, thiophenol. Monofunctional carboxylic acids include: formic acid, acetic acid, propionic acid, butyric acid, fatty acids such as stearic acid, palmitic acid, oleic acid, linoleic acid, linolenic acid, benzoic acid, acrylic acid.

Polyhydric alcohols suitable as H-functional starter substances are, for example, dihydric alcohols (for example ethylene glycol, diethylene glycol, propylene glycol, dipropylene glycol, propane-1,3-diol, butane-1,4-diol, butene-1,4-diol, butyne-1,4-diol, neopentyl glycol, pentane-1,5-diol, methylpentanediols (for example 3-methylpentane-1,5-diol), hexane-1,6-diol; octane-1,8-diol, decane-1,10-diol, dodecane-1,12-diol, bis(hydroxymethyl)cyclohexanes (for example 1,4-bis(hydroxymethyl)cyclohexane), triethylene glycol, tetraethylene glycol, polyethylene glycols, dipropylene glycol, tripropylene glycol, polypropylene glycols, dibutylene glycol and polybutylene glycols); trihydric alcohols (for example trimethylolpropane, glycerol, trishydroxyethyl isocyanurate, castor oil); tetrahydric alcohols (for example pentaerythritol); polyalcohols (for example sorbitol, hexitol, sucrose, starch, starch hydrolyzates, cellulose, cellulose hydrolyzates, hydroxy-functionalized fats and oils, in particular castor oil), and all modification products of these aforementioned alcohols with different amounts of ε-caprolactone.

The H-functional starter substances may also be selected from the substance class of the polyether polyols, especially those having a molecular weight Mn in the range from 100 to 4000 g/mol. Preference is given to polyether polyols formed from repeat ethylene oxide and propylene oxide units, preferably having a proportion of 35% to 100% propylene oxide units, more preferably having a proportion of 50% to 100% propylene oxide units. These may be random copolymers, gradient copolymers, alternating or block copolymers formed from ethylene oxide and propylene oxide. Suitable polyether polyols formed from repeat propylene oxide and/or ethylene oxide units are, for example, the Desmophen®, Acclaim®, Arcol®, Baycoll®, Bayfill®, Bayflex®, Baygal®, PET® and polyether polyols from Bayer MaterialScience AG (for example Desmophen® 3600Z, Desmophen® 1900U, Acclaim® Polyol 2200, Acclaim® Polyol 40001, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Further suitable homopolyethylene oxides are for example the Pluriol® E brands from BASF SE, suitable homopolypropylene oxides are for example the Pluriol® P brands from BASF SE; suitable mixed copolymers of ethylene oxide and propylene oxide are for example the Pluronic® PE or Pluriol® RPE brands from BASF SE.

The H-functional starter substances may also be selected from the substance class of the polyester polyols, especially those having a molecular weight Mn in the range from 200 to 4500 g/mol. Polyester polyols used are at least difunctional polyesters. Polyester polyols preferably consist of alternating acid and alcohol units. Acid components used are, for example, succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the acids and/or anhydrides mentioned. Alcohol components used are, for example, ethanediol, propane-1,2-diol, propane-1,3-diol, butane-1,4-diol, pentane-1,5-diol, neopentyl glycol, hexane-1,6-diol, 1,4-bis(hydroxymethyl)cyclohexane, diethylene glycol, dipropylene glycol, trimethylolpropane, glycerol, pentaerythritol or mixtures of the alcohols mentioned. If the alcohol components used are dihydric or polyhydric polyether polyols, the result is polyester ether polyols which can likewise serve as starter substances for preparation of the polyether carbonate polyols. Preference is given to using polyether polyols with $M_n$=150 to 2000 g/mol for preparation of the polyester ether polyols.

In addition, H-functional starter substances used may be polycarbonate diols, especially those having a molecular weight Mn in the range from 150 to 4500 g/mol, preferably 500 to 2500, which are prepared, for example, by reaction of phosgene, dimethyl carbonate, diethyl carbonate or diphenyl carbonate and difunctional alcohols or polyester polyols or polyether polyols. Examples of polycarbonates can be found, for example, in EP-A 1359177. Examples of polycarbonate diols that may be used include the Desmophen® C range from Bayer MaterialScience AG, for example Desmophen® C 1100 or Desmophen® C 2200.

In a further embodiment of the invention, it is possible to use polyether carbonate polyols as H-functional starter substances. More particularly, polyether carbonate polyols obtainable by the process of the invention described here are used. For this purpose, these polyether carbonate polyols used as H-functional starter substances are prepared beforehand in a separate reaction step.

The H-functional starter substances generally have a functionality (i.e. number of hydrogen atoms that are active in respect of the polymerization per molecule) of 1 to 8, preferably of 2 or 3. The H-functional starter substances are used either individually or as a mixture of at least two H-functional starter substances.

Preferred H-functional starter substances are alcohols of the general formula (II)

$$HO-(CH_2)_x-OH \qquad (II)$$

where x is a number from 1 to 20, preferably an even number from 2 to 20. Examples of alcohols of formula (II) are ethylene glycol, butane-1,4-diol, hexane-1,6-diol, octane-1,8-diol, decane-1,10-diol and dodecane-1,12-diol. If the alcohols are solid or highly viscous at 20° C., it is advantageous to heat the feeds to the tubular reactor. Further preferred H-functional starter substances are neopentyl glycol, trimethylolpropane, glycerol, pentaerythritol, reaction products of the alcohols of formula (II) with ε-caprolactone, e.g. reaction products of trimethylolpropane with ε-caprolactone, reaction products of glycerol with ε-caprolactone, and reaction products of pentaerythritol with ε-caprolactone. Also preferably employed as H-functional starter substances are water, diethylene glycol, dipropylene glycol, castor oil, sorbitol and polyether polyols formed from repeat polyalkylene oxide units.

The H-functional starter substances are particularly preferably one or more compounds selected from the group consisting of ethylene glycol, propylene glycol, propane-1,3-diol, butane-1,3-diol, butane-1,4-diol, pentane-1,5-diol, 2-methylpropane-1,3-diol, neopentyl glycol, hexane-1,6-diol, octane-1,8-diol, diethylene glycol, dipropylene glycol, glycerol, trimethylolpropane, di- and trifunctional polyether polyols, where the polyether polyol has been formed from a di- or tri-H-functional starter substance and propylene oxide or a di- or tri-H-functional starter substance, propylene oxide and ethylene oxide. The polyether polyols preferably have a molecular weight Mn in the range from 62 to 4500 g/mol and a functionality of 2 to 3, and especially a molecular weight Mn in the range from 62 to 3000 g/mol and a functionality of 2 to 3.

The polyether carbonate polyols are prepared by catalytic addition of carbon dioxide and alkylene oxides onto H-functional starter substances. "H-functional" in the context of the present invention is understood to mean the number of hydrogen atoms that are active in respect of the alkoxylation per molecule of the starter compound.

DMC catalysts are known in principle from the prior art (see, for example, U.S. Pat. Nos. 3,404,109, 3,829,505, 3,941,849, and 5,158,922). DMC catalysts, which are described, for example, in U.S. Pat. No. 5,470,813, EP-A 700 949, EP-A 743 093, EP-A 761 708, WO 97/40086, WO 98/16310 and WO 00/47649, have a very high activity in the homopolymerization of epoxides and enable the preparation of polyether polyols at very low catalyst concentrations (25 ppm or less), such that removal of the catalyst from the finished product may no longer be required. An example of a DMC catalyst used is a metal complex catalyst based on the metals zinc and cobalt. For example, highly active DMC catalysts contain a double metal cyanide compound (e.g. zinc hexacyanocobaltate(III)), an organic complex ligand (e.g. tert-butanol) and polyether polyol having a number-average molecular weight greater than 500 g/mol; such DMC catalysts are described, for example, in EP-A 700 949.

It is also possible to use the alkaline DMC catalysts disclosed in EP application number 10163170.3.

Cyanide-free metal salts suitable for preparation of the double metal cyanide compounds preferably have the general formula (III)

$$M(X)_n \qquad (III)$$

where

M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$, X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

n is 1 when X=sulfate, carbonate or oxalate and n is 2 when X=halide, hydroxide, cyanate, thiocyanate, isocyanate, isothiocyanate or nitrate, or suitable cyanide-free metal salts have the general formula (IV)

$$M_r(X)_3 \qquad (IV)$$

where

M is selected from the metal cations $Fe^{3+}$, $Al^{3+}$ and $Cr^{3+}$,

X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

r is 2 when X=sulfate, carbonate or oxalates and r is 1 when X=halide, hydroxide, cyanate, thiocyanate, isocyanate, isothiocyanate, carboxylate or nitrate, or suitable cyanide-free metal salts have the general formula (V), $$M(X)_s \qquad (V)$$

where

M is selected from the metal cations $Mo^{4+}$, $V^{4+}$ and $W^{4+}$,

X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

s is 2 when X=sulfate, carbonate or oxalate and s is 4 when X=halide, hydroxide, cyanate, thiocyanate, isocyanate, isothiocyanate, carboxylate or nitrate, or suitable cyanide-free metal salts have the general formula (VI)

$$M(X)_t \qquad (VI)$$

where

M is selected from the metal cations $Mo^{6+}$ and $W^{6+}$,

X is one or more (i.e. different) anions, preferably an anion selected from the group of the halides (i.e.

fluoride, chloride, bromide, iodide), hydroxide, sulfate, carbonate, cyanate, thiocyanate, isocyanate, isothiocyanate, carboxylate, oxalate and nitrate;

t is 3 when X=sulfate, carbonate or oxalate and t is 6 when X=halide, hydroxide, cyanate, thiocyanate, isocyanate, isothiocyanate, carboxylate or nitrate, Examples of suitable cyanide-free metal salts are zinc chloride, zinc bromide, zinc iodide, zinc acetate, zinc acetylacetonate, zinc benzoate, zinc nitrate, iron(II) sulfate, iron (II) bromide, iron(II) chloride, cobalt(II) chloride, cobalt(II) thiocyanate, nickel(II) chloride and nickel(II) nitrate. It is also possible to use mixtures of different metal salts.

Metal cyanide salts suitable for preparation of the double metal cyanide compounds preferably have the general formula (VII)

$$(Y)_a M'(CN)_b (A)_c \qquad (VII)$$

where

M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II), Y is selected from one or more metal cations from the group consisting of alkali metal (i.e. $Li^+$, $Na^+$, $K^+$, $Rb^+$, $Cs^+$) and alkaline earth metal (i.e. $Be^{2+}$, $Ca^{2+}$, $Mg^{2+}$, $Sr^{2+}$, $Ba^{2+}$), A is selected from one or more anions from the group consisting of halides (i.e. fluoride, chloride, bromide, iodide), hydroxide, sulfate, carbonate, cyanate, thiocyanate, isocyanate, isothiocyanate, carboxylate, oxalate or nitrate and a, b and c are integers, where the values of a, b and c are selected so as to give an electrically neutral metal cyanide salt; a is preferably 1, 2, 3 or 4; b is preferably 4, 5 or 6; c preferably has the value of 0.

Examples of suitable metal cyanide salts are potassium hexacyanocobaltate(III), potassium hexacyanoferrate(II), potassium hexacyanoferrate(III), calcium hexacyanocobaltate(III) and lithium hexacyanocobaltate(III).

Preferred double metal cyanide compounds present in the DMC catalysts are compounds of the general formula (VIII)

$$M_x[M'_{x'}(CN)_y]_z \qquad (VIII),$$

in which M is defined as in formula (III) to (VI) and

M' is defined as in formula (VII), and x, x', y and z are integers and are chosen so as to give an electrically neutral double metal cyanide compound.

Preferably, x=3, x'=1, y=6 and z=2,

M=Zn(II), Fe(II), Co(II) or Ni(II) and

M'=Co(III), Fe(III), Cr(III) or Ir(III).

Examples of suitable double metal cyanide compounds are zinc hexacyanocobaltate(III), zinc hexacyanoiridate(III), zinc hexacyanoferrate(III) and cobalt(II) hexacyanocobaltate(II). Further examples of suitable double metal cyanide compounds can be found, for example, in U.S. Pat. No. 5,158,922 (column 8 lines 29-66). Particular preference is given to using zinc hexacyanocobaltate(III).

The organic complex ligands added in the preparation of the DMC catalysts are disclosed, for example, in U.S. Pat. No. 5,158,922 (see especially column 6 lines 9 to 65), U.S. Pat. Nos. 3,404,109, 3,829,505, 3,941,849, EP-A 700 949, EP-A 761 708, JP 4 145 123, U.S. Pat. No. 5,470,813, EP-A 743 093 and WO-A 97/40086. For example, organic complex ligands used are water-soluble organic compounds having heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butyl, isobutanol, sec-butanol, tert-butanol, 2-methyl-3-buten-2-ol and 2-methyl-3-butyn-2-ol) and compounds containing both aliphatic or cycloaliphatic ether groups and aliphatic hydroxyl groups (for example ethylene glycol mono-tert-butyl ether, diethylene glycol mono-tert-butyl ether, dipropylene glycol monomethyl ether and 3-methyl-3-oxetanemethanol). Most preferred organic complex ligands are selected from one or more compounds from the group consisting of dimethoxyethane, tert-butanol, 2-methyl-3-buten-2-ol, 2-methyl-3-butyn-2-ol, ethylene glycol mono-tert-butyl ether and 3-methyl-3-oxetanemethanol.

Optionally, in the preparation of the DMC catalysts, one or more complex-forming component(s) from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkylacrylates, polyalkylmethacrylates, polyvinyl methyl ether, polyvinyl ethyl ether, polyvinyl acetate, polyvinyl alcohol, poly-N-vinylpyrrolidone, poly (N-vinylpyrrolidone-co-acrylic acid), polyvinyl methyl ketone, poly(-vinylphenol), poly(acrylic acid-co-styrene), oxazoline polymers, polyalkyleneimines, maleic acid and maleic anhydride copolymers, hydroxyethyl cellulose and polyacetals, or of the glycidyl ethers, glycosides, carboxylic esters of polyhydric alcohols, gallic acid or the salts, esters or amides thereof, cyclodextrins, phosphorus compounds, α,β-unsaturated carboxylic esters or ionic surface- or interface-active compounds.

Preferably, in the preparation of the DMC catalysts, in the first step, the aqueous solutions of the metal salt (e.g. zinc chloride), used in a stoichiometric excess (at least 50 mol % based on metal cyanide salt, i.e. at least a molar ratio of cyanide-free metal salt to metal cyanide salt of 2.25:1.00), and of the metal cyanide salt (e.g. potassium hexacyanocobaltate) are converted in the presence of the organic complex ligand (e.g. tert-butanol), such that a suspension containing the double metal cyanide compound (e.g. zinc hexacyanocobaltate), water, excess cyanide-free metal salt and the organic complex ligand is formed. This organic complex ligand may be present in the aqueous solution of the cyanide-free metal salt and/or of the metal cyanide salt, or it is added directly to the suspension obtained after precipitation of the double metal cyanide compound. It has been found to be advantageous to mix the aqueous solutions of the cyanide-free metal salt and of the metal cyanide salt and the organic complex ligands by stirring vigorously. Optionally, the suspension formed in the first step is subsequently treated with a further complex-forming component. The complex-forming component is preferably used in a mixture with water and organic complex ligand. A preferred process for performing the first step (i.e. the preparation of the suspension) is effected using a mixing nozzle, more preferably using a jet disperser as described in WO-A 01/39883.

In the second step, the solid (i.e. the precursor of the catalyst) is isolated from the suspension by known techniques, such as centrifugation or filtration.

In a preferred execution variant for preparing the catalyst, the isolated solid is subsequently washed in a third process step with an aqueous solution of the organic complex ligand (for example by resuspension and subsequent reisolation by filtration or centrifugation). In this way, it is possible, for example, to remove water-soluble by-products, such as potassium chloride, from the catalyst. Preferably, the amount of the organic complex ligand in the aqueous wash solution is between 40% and 80% by weight, based on the overall solution.

Optionally, in the third step, further complex-forming component is added to the aqueous wash solution, preferably in the range between 0.5% and 5% by weight, based on the overall solution.

It is also advantageous to wash the isolated solids more than once. For this purpose, for example, the first washing procedure can be repeated. It is preferable, however, to use non-aqueous solutions for further washing operations, e.g. a mixture of organic complex ligand and other complex-forming component.

The isolated and optionally washed solid is subsequently dried at temperatures of generally 20-100° C. and at pressures of generally 0.1 mbar to atmospheric pressure (1013 mbar), optionally after pulverizing.

A preferred process for isolation of the DMC catalysts from the suspension by filtration, filtercake washing and drying is described in WO-A 01/80994.

Preference is given to using an excess of carbon dioxide based on the calculated amount of carbon dioxide incorporated in the polyether carbonate polyol, since an excess of carbon dioxide is advantageous because of the inertness of carbon dioxide. The amount of carbon dioxide can be fixed via the reaction pressure or via the volume flow rate. An advantageous reaction pressure in the main reactor and tubular reactor for the copolymerization for preparation of the polyether carbonate polyols has been found to be the range from 10 to 200 bar, more preferably 15 to 180 bar, most preferably 20 to 120 bar. For the process of the invention, it has also been found that the copolymerization in the main reactor for preparation of the polyether carbonate polyols in the main reactor is advantageously conducted at 80 to 150° C., preferably 90 to 135° C. If temperatures below 80° C. are established in the main reactor, for example 50° C., the reaction stops. At temperatures above 150° C. in the main reactor, the amount of unwanted by-products rises significantly. It is also advantageous that the $CO_2$, with the choice of pressure and temperature, is very substantially in the liquid and/or supercritical state.

The present invention further provides an apparatus for preparing polyether carbonate polyols by adding one or more alkylene oxides and carbon dioxide onto one or more H-functional starter substances in the presence of at least one DMC catalyst, comprising a main reactor and a tubular reactor which follows downstream of the latter as postreactor, wherein the apparatus is characterized in that the tubular reactor is configured such that a temperature at least 10° C. above the temperature within the main reactor can be set at the exit of said tubular reactor, wherein the temperature at the exit of the tubular reactor is set via assignment of a heating unit thereto or provision of the tubular reactor with an insulation, such that it has a coefficient of heat transfer k as defined according to VDI-Wärmeatlas, 2013 (DOI 10.1007/978-3-642-19981-3), Section E1 of not more than 12 W/m²K, especially of not more than 8 W/m²K. The main reactor is especially configured as a continuously operated stirred reactor.

The apparatus may be configured such that the tubular reactor is equipped at its exit with a temperature sensor, the temperature sensor especially being coupled to the heating unit for control of the heating unit of the tubular reactor.

Figure 1:
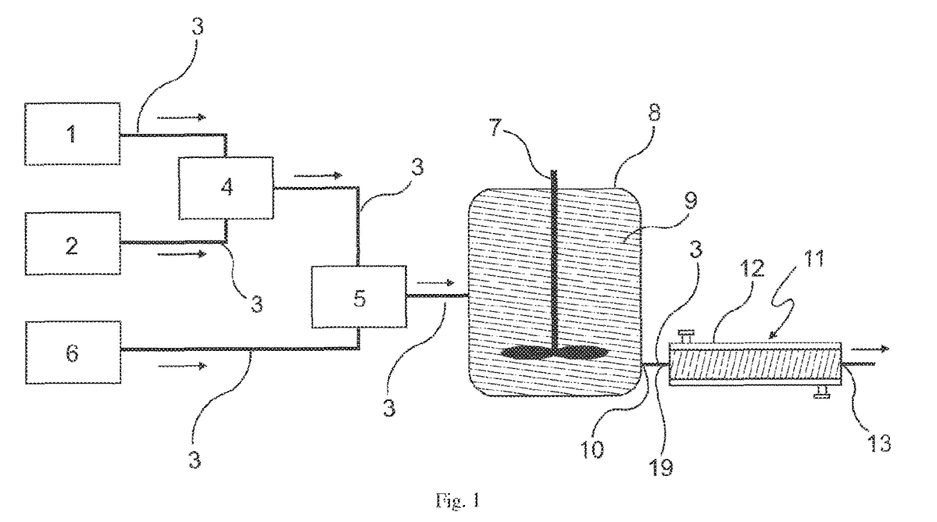
FIG. 1 The schematic construction of an experimental arrangement for preparation of polyether carbonate polyols.
Figure 2:
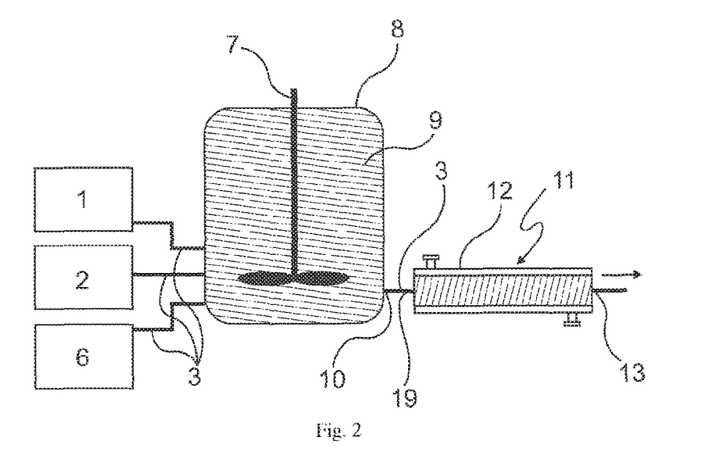
FIG. 2 An alternative experimental arrangement for preparation of polyether carbonate polyols.
Figure 3:
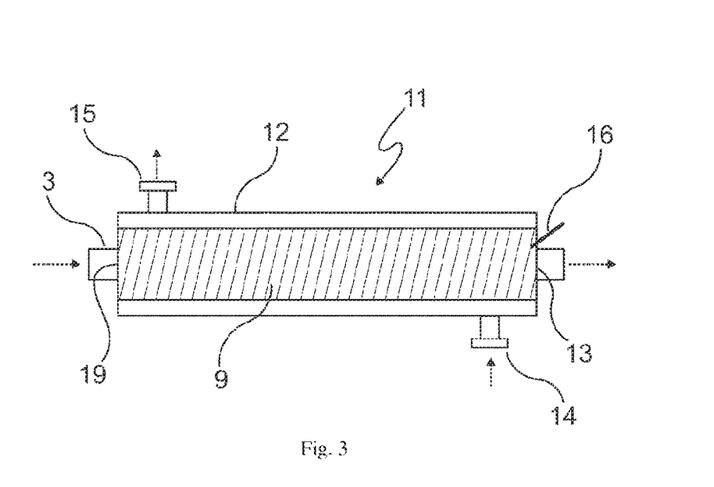
FIG. 3 A first embodiment of a tubular reactor of the invention with heating.
Figure 4:
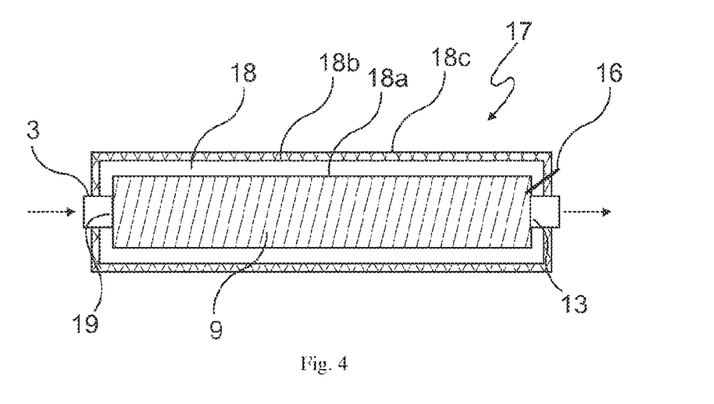
FIG. 4 A second embodiment of a tubular reactor of the invention with thermal insulation.

The invention is elucidated in detail hereinafter by FIGS. 1 to 4 and with the aid of working examples. These figures show:

FIG. 1 the schematic construction of an experimental arrangement for preparation of polyether carbonate polyols, FIG. 2 an alternative experimental arrangement for preparation of polyether carbonate polyols, FIG. 3 a first embodiment of a tubular reactor of the invention with heating, FIG. 4 a second embodiment of a tubular reactor of the invention with thermal insulation, FIG. 1 shows a schematic construction of an experimental arrangement for preparation of polyether carbonate polyols according to the present invention. In this figure, a stirred reservoir vessel 1 contains a suspension consisting of an H-functional starter substance and ground and dried DMC catalyst. Propylene oxide is stored in a further reservoir vessel 2. The suspension from the reservoir vessel 1 and the propylene oxide from the reservoir vessel 2 are each conveyed by means of pumps (not shown in the present case) assigned to the respective reservoir vessels 1, 2 via pipelines 3 to a mixer 4 configured as a cascade mixer. The pumps used in the present case are HPLC pumps. In the cascade mixer 4, the components supplied are mixed at a temperature of about 40° C., with no reaction as yet.

This mixture thus produced is fed further through a pipeline 3 to a further mixer 5, in the present case a cascade mixer, into which carbon dioxide is simultaneously fed by means of a pump from a reservoir vessel 6, in the present case a gas bottle with a riser tube. The mixing is effected at a temperature of about 40° C., likewise with no reaction as yet.

Mixers 4 and 5 used may also be the mixers specified in published specification WO 2007/135154 A1, especially what are called split-recombine mixers, for example the "Kaskadenmischer 2S" cascade mixer from Ehrfeld Mikrotechnik BTS GmbH. Such a split-recombine mixer features stages of recurrent separation and combination of streams. In each of these stages, the number of lamellae is successively doubled and hence lamella thickness and diffusion distance are halved. Instead, the mixing can also be effected by means of a conventional static mixer, by means of nozzles and by means of mixers having moving, rotating internals.

From the cascade mixer 5, the reaction mixture is introduced through a further pipeline 3 into a main reactor 8 fitted with a stirrer 7 and equipped with a heater. The main reactor 8 is designed as a pressure reactor in which the mixture is reacted at 105° C. and a pressure of 50 bar.

As soon as the reaction mixture 9 present in the pressure reactor 8 has reached a conversion at which the reaction mixture 9 has a residual propylene oxide content of about 3% to 4% by weight based on the reaction mixture 9, the reaction mixture 9 is fed via a precursor product outlet 10 through a pipeline 3 to a postreactor 11, configured in the present case as a tubular reactor. The tubular reactor 11 has an entrance 19, a heating jacket 12 heatable by means of a heating fluid, and an exit 13. The heating jacket 12 heats the tubular reactor 11 in such a way that the reaction mixture 9 flowing through it in the direction of the arrow has a temperature of 125° C. at the exit 13 of the tubular reactor 11, i.e. about 20° C. above the temperature of the pressure reactor 8.

The polyether carbonate polyol leaving the tubular reactor 11 at its exit 13 contains virtually no free propylene oxide any longer and has only a very low additional content of the cyclic propylene carbonate compared to the reaction mixture 9 at the precursor product outlet 10.

FIG. 2 shows, in schematic form, a preferred configuration of an experimental arrangement for preparation of polyether carbonate polyols according to the present invention. The construction differs from that shown in FIG. 1 in that the reservoir vessels 1, 2, 6 are connected directly via pipelines 3 to the pressure reactor 8, such that the reactants are not mixed until within the pressure reactor 8.

FIG. 3 shows the tubular reactor 11 used in FIG. 1 and FIG. 2 in an enlarged view. It is apparent therein that the heating jacket 12 has an inlet 14 and an outlet 15 for a heating fluid which flows through the heating jacket 12 in the direction indicated by arrows and in so doing heats the reaction mixture 9 flowing through the tubular reactor 11 in the direction likewise indicated by arrows to the desired temperature, measured at the exit 13.

In this embodiment of the tubular reactor 11, the desired temperature at the exit 13 of the tubular reactor 11 is set partly by the heat supplied by means of the heating jacket 12 and partly by the thermal energy released in the chemical conversion of the reaction mixture 9. For monitoring of the desired temperature at the exit 13 of the tubular reactor 11, it is equipped with a temperature sensor 16 at its outlet 13. The temperature sensor 16 is in turn connected to a control unit which is not shown in the present case, which controls the flow rate and/or the temperature of the heating fluid that flows through the heating jacket 12.

FIG. 4 depicts an alternative embodiment of a tubular reactor 17 which can be used in place of the heated tubular reactor 11 in a construction according to FIG. 1 and FIG. 2. The tubular reactor 17 has essentially the same construction as the tubular reactor 11, but in contrast to the latter is provided not with a heating unit but with a thermally insulating jacket 18 which encloses the reaction tube of the tubular reactor 17. In this embodiment, the heating of the reaction mixture 9 that flows through the tubular reactor 17 in the direction indicated by arrows is achieved exclusively by means of the heat of reaction released in the postreaction of the reaction mixture 9 in the tubular reactor 17. The thermally insulating jacket 18 is configured in the present case as a concentric double tube with an inner tube 18a, an outer tube 18b and an insulating layer 18c applied to the outer tube 18b. The intermediate space between the inner tube 18a and the outer tube 18b is evacuated, such that the tubular reactor 17 in the isolated regions has a coefficient of heat transfer k according to VDI-Wärmeatlas, 2013 (DOI 10.1007/978-3-642-19981-3), Section E1, p. 721 ff. of 1.0 W/m²K.

After performance of the process of the invention for preparing the polyether carbonate polyol, the resulting reaction mixture generally comprises the DMC catalyst in the form of finely dispersed solid particles. It may therefore be desirable to remove as much as possible of the DMC catalyst from the resulting reaction mixture. The removal of the DMC catalyst firstly has the advantage that the resulting polyether carbonate polyol achieves industry- or certification-relevant limits for example in terms of metal contents or in terms of other emissions resulting from activated catalyst remaining in the product and also facilitates recovery of the DMC catalyst.

The DMC catalyst may be removed very substantially or completely using various methods. The DMC catalyst may be separated from the polyether carbonate polyol using membrane filtration (nanofiltration, ultrafiltration or cross-flow filtration), using cake filtration, using precoat filtration or by centrifugation. Preferably, removal of the DMC catalyst is accomplished by a multistage process consisting of at least two steps.

For example, in a first step, the reaction mixture to be filtered is divided in a first filtration step into a larger substream (filtrate) in which a majority of the catalyst or all the catalyst has been removed, and a smaller residual stream (retentate) comprising the catalyst removed. In a second step, the residual stream is then subjected to a dead end filtration. This affords a further filtrate stream in which a majority of the catalyst or all the catalyst has been removed, and a damp to very substantially dry catalyst residue.

Alternatively, the catalyst present in the polyether carbonate polyol can be subjected in a first step to an adsorption, agglomeration/coagulation and/or flocculation, followed by, in a second step or a plurality of subsequent steps, the separation of the solid phase from the polyether carbonate polyol. Suitable adsorbents for mechanical-physical and/or chemical adsorption include activated or non-activated aluminas and bleaching earths (sepiolite, montmorillonite, talc etc.), synthetic silicates, activated carbon, siliceous earths/kieselguhrs and activated siliceous earths/kieselguhrs in amounts typically ranging from 0.1% by weight to 2% by weight, preferably 0.8% by weight to 1.2% by weight, based on the polyether carbonate polyol, at temperatures of from 60° C. to 140° C., preferably 90° C. to 110° C., and with residence times of 20 min to 100 min, preferably 40 min to 80 min, it being possible to conduct the adsorption step, including the mixing-in of the adsorbent, in batchwise or continuous mode.

A preferred process for removing this solid phase (consisting, for example, of adsorbent and DMC catalyst) from the polyether carbonate polyol is precoat filtration. In this method, depending on the filtration characteristics, which are determined by the particle size distribution of the solid phase to be removed, by the mean specific resistance of the resulting filtercake and by the total resistance of the precoat layer and filtercake, the filter surface is coated with a permeable filtration aid (for example inorganic: Celite, perlite; organic: cellulose) having a layer thickness of 20 mm to 250 mm, preferably 100 mm to 200 mm ("pre-coat"). The majority of the solid phase (consisting, for example, of adsorbent and DMC catalyst) is removed at the surface of the precoat layer in combination with depth filtration of the smaller particles within the precoat layer. The temperature of the crude product to be filtered is generally in the range from 50° C. to 120° C., preferably 70° C. to 100° C.

In order to ensure a sufficient flow of product through the precoat layer and the cake layer growing thereon, the cake layer and a small part of the precoat layer may be removed (periodically or continuously) using a scraper or blade and removed from the process. This scraper/blade is moved at minimal advance rates of about 20 µm/min-500 µm/min, preferably in the range of 50 µm/min-150 µm/min.

As soon as the precoat layer has been very substantially or completely removed by this process, the filtration is stopped and a new precoat layer is applied to the filter surface. In this case, the filtration aid may be suspended, for example, in cyclic propylene carbonate.

This precoat filtration is typically conducted in vacuum drum filters. In order to achieve industrially relevant filtrate throughputs in the range from 0.1 m³/(m²·h) to 5 m³/(m²·h) in the case of a viscous feed stream, the drum filter may also be executed as a pressure drum filter with pressure differentials of up to 6 bar or more between the medium to be filtered and the filtrate side.

In principle, the DMC catalyst may be removed from the resulting reaction mixture in the process of the invention either before removal of volatile constituents (for example cyclic propylene carbonate) or after the removal of volatile constituents.

In addition, the separation of the DMC catalyst from the resulting reaction mixture from the process of the invention may be conducted with or without the further addition of a solvent (especially cyclic propylene carbonate) for the purpose of lowering the viscosity before or during the individual steps of catalyst removal described.

In a first embodiment, the invention thus relates to a process for preparing polyether carbonate polyols by adding one or more alkylene oxides and carbon dioxide onto one or more H-functional starter substances in the presence of at least one DMC catalyst, in which the reaction is conducted in a main reactor (8) and in a tubular reactor (11, 17) which follows downstream of the latter as postreactor, characterized in that a temperature at least 10° C. above the temperature within the main reactor (8) is set at the exit (13) of the tubular reactor (11, 17).

In a second embodiment, the invention relates to a process according to the first embodiment, characterized in that a temperature 10° C. to 40° C. above the temperature within the main reactor (8), especially 15 to 35° C., is set at the exit (13) of the tubular reactor (11, 17).

In a third embodiment, the invention relates to a process according to the first or second embodiment, characterized in that the temperature is set at the exit (13) of the tubular reactor (11, 17) in such a way that this temperature, per % by weight of unreacted alkylene oxide measured at the entrance (19) to the tubular reactor (11, 17), is 2.5 to 12° C. above the temperature within the main reactor (8), especially 3 to 7° C. per % by weight of unreacted alkylene oxide.

In a fourth embodiment, the invention relates to a process according to any of embodiments 1 to 3, characterized in that the temperature at the exit (13) of the tubular reactor (11, 17) is set by means of a heating unit (12) which is assigned to the tubular reactor (11, 17) or by means of an insulation (18) of the tubular reactor (11, 17).

In a fifth embodiment, the invention relates to a process according to any of embodiments 1 to 4, characterized in that the reaction mixture (9) is fed from the main reactor (8) into the tubular reactor (11, 17) in such a way that the reaction mixture (9) at the entrance (19) to the tubular reactor (11, 17) has a content of unconverted alkylene oxides of 1% to 10% by weight, based on the reaction mixture (9), especially 2% to 6% by weight, preferably 3% to 4% by weight.

In a sixth embodiment, the invention relates to a process according to any of embodiments 1 to 5, characterized in that
(i) the DMC catalyst is suspended in one or more H-functional starter substances,
(ii) the suspension from (i) is combined with one or more alkylene oxides and with 10 to 200 bar of carbon dioxide, especially 15 to 180 bar, and
(iii) the mixture resulting from (ii) is reacted in the main reactor (8) at a temperature of 80 to 150° C., wherein the pressures set in the tubular reactor (11, 17) are essentially the same pressures as in the main reactor (8), wherein preferably
(ii-1) the suspension from (i) is first combined in a first mixer (4) with one or more alkylene oxides and then in a second mixer (5) with 10 to 200 bar of carbon dioxide, or
(ii-2) the suspension from (i) is first combined in a first mixer with 10 to 200 bar of carbon dioxide and then in a second mixer with one or more alkylene oxides.

In a seventh embodiment, the invention relates to a process according to any of embodiments 1 to 5, characterized in that the DMC catalyst, the H-functional starter substance, the alkylene oxide and the carbon dioxide are fed directly to the main reactor (8) and reacted therein, especially at a temperature of 90 to 135° C. and a reaction pressure of 20 to 180 bar, the DMC catalyst preferably being fed directly to the main reactor (8) as a dispersion in the H-functional starter substance, the alkylene oxide and the carbon dioxide.

In an eighth embodiment, the invention relates to a process according to any of embodiments 1 to 7, characterized in that the internal diameter of the tubular reactor (11, 17), at least in sections or over its entire length, is 1.1 mm to 900 mm.

In a ninth embodiment, the invention relates to a process according to any of embodiments 1 to 8, characterized in that the tubular reactor (11, 17) is formed from a continuous piece of tube or from at least two tubes following on from one another in flow direction.

In a tenth embodiment, the invention relates to a process according to any of embodiments 1 to 9, characterized in that the tubular reactor (11, 17), in a first subsection that extends over 20% to 60% of its total length, has an internal diameter of 1.1 mm to <100 mm and, over a second subsection that follows downstream of the first subsection, and which extends over 80% to 40% of its total length, an internal diameter of 100 mm to 500 mm.

In an eleventh embodiment, the invention relates to a process according to any of embodiments 1 to 10 characterized in that the tubular reactor (11, 17) has a ratio of tube length L to internal tube diameter $d_R$ of $L/d_R > 50$.

In a twelfth embodiment, the invention relates to a process according to any of embodiments 1 to 11, characterized in that the main reactor (8) is a continuously operated tubular reactor.

In a thirteenth embodiment, the invention relates to a process according to any of embodiments 1 to 12, characterized in that the H-functional starter substance is selected from at least one of the group consisting of polyether polyol, polyester polyol, polyether carbonate polyol, water, ethylene glycol, diethylene glycol, propylene glycol, dipropylene glycol, propane-1,3-diol, butane-1,4-diol, butene-1,4-diol, butyne-1,4-diol, neopentyl glycol, pentane-1,5-diol, 3-methylpentane-1,5-diol, hexane-1,6-diol, octane-1,8-diol, decane-1,10-diol, dodecane-1,12-diol, 1,4-bis(hydroxymethyl)cyclohexane, triethylene glycol, tetraethylene glycol, dipropylene glycol, tripropylene glycol, dibutylene glycol, trimethylolpropane, glycerol, trishydroxyethyl isocyanurate, castor oil, pentaerythritol, sorbitol, hexitol, sucrose, starch, starch hydrolyzate, cellulose, cellulose hydrolyzate, hydroxy-functionalized fats and hydroxy-functionalized oils.

In a fourteenth embodiment, the invention relates to an apparatus for preparing polyether carbonate polyols by adding one or more alkylene oxides and carbon dioxide onto one or more H-functional starter substances in the presence of at least one DMC catalyst, comprising a main reactor (8) and a tubular reactor (11, 17) which follows downstream of the latter as postreactor, characterized in that the tubular reactor (11, 17) is configured such that a temperature at least 10° C. above the temperature within the main reactor (8) can be set at the exit (13) of said tubular reactor, wherein the temperature at the exit (13) of the tubular reactor (11, 17) is set via assignment of a heating unit (12) thereto or provision of the tubular reactor (11, 17) with an insulation (18), such that it has a heat loss according to VDI-Wärmeatlas, 2013 (DOI 10.1007/978-3-642-19981-3), section E1 of not more than 12 W/m²K, especially of not more than 8 W/m²K.

In a fifteenth embodiment, the invention relates to an apparatus according to the fourteenth embodiment, characterized in that the tubular reactor (11, 17) is equipped at its exit (13) with a temperature sensor (16), the temperature sensor (16) especially being coupled to the heating unit (12) for control of the heating unit (12) of the tubular reactor (11, 17).

In a sixteenth embodiment, the invention relates to a process for preparing polyether carbonate polyols by adding one or more alkylene oxides and carbon dioxide onto one or more H-functional starter substances in the presence of at least one metal complex catalyst based on the metals zinc and/or cobalt, in which the reaction is conducted in a main reactor (8) and in a tubular reactor (11, 17) which follows downstream of the latter as postreactor, characterized in that a temperature at least 10° C. above the temperature within the main reactor (8) is set at the exit (13) of the tubular reactor (11, 17).

The polyether carbonate polyols obtainable by the process of the invention can be processed without difficulty, especially by reaction with di- and or polyisocyanates to give polyurethanes, especially to give flexible polyurethane foams (for example flexible slabstock polyurethane foams and flexible molded polyurethane foams), polyurethane elastomers, polyurethane thermoplastics, rigid polyurethane foams, polyurethane-based paint raw materials and polyurethane-based coatings. For polyurethane applications, it is preferable to use polyether carbonate polyols based on an H-functional starter substance having a functionality of at least 2. In addition, the polyether carbonate polyols obtainable by the process of the invention can be used in applications such as washing and cleaning composition formulations, drilling fluids, fuel additives, ionic and nonionic surfactants, lubricants, process chemicals for papermaking or textile manufacture, or cosmetic formulations. The person skilled in the art is aware that, depending on the respective field of use, the polyether carbonate polyols to be used have to fulfill certain physical properties, for example molecular weight, viscosity, functionality and/or hydroxyl number.

EXAMPLES

The OH number was determined according to the method of DIN 53240. The reporting of the unit in "mg/g" relates to mg[KOH]/g[polyether carbonate polyol].

The proportion of $CO_2$ incorporated in the resulting polyether carbonate polyol and the ratio of propylene carbonate (cyclic carbonate) to polyether carbonate polyol were determined by means of $^1H$ NMR (Bruker DPX 400, 400 MHz; pulse program zg30, relaxation delay d1: 10 s, 64 scans). Each sample was dissolved in deuterated chloroform. The relevant resonances in the $^1H$ NMR (based on TMS=0 ppm) are as follows:

Cyclic carbonate (which was formed as a by-product) resonance at 4.5 ppm, linear carbonate resulting from carbon dioxide incorporated in the polyether carbonate polyol (resonances at 5.1 to 4.8 ppm), unreacted propylene oxide (PO) with resonance at 2.4 ppm, polyether polyol (i.e. without incorporated carbon dioxide) with resonances at 1.2 to 1.0 ppm, any octane-1,8-diol incorporated as starter molecule with a resonance at 1.6 to 1.52 ppm.

The mole fraction of the carbonate incorporated in the polymer in the reaction mixture is calculated as per formula (IX) as follows, using the following abbreviations:

A(4.5)=area of the resonance at 4.5 ppm for cyclic carbonate (corresponds to an H atom)

A(5.1-4.8)=area of the resonance at 5.1-4.8 ppm for polyether carbonate polyol and an H atom for cyclic carbonate A(2.4)=area of the resonance at 2.4 ppm for free, unreacted PO A(1.2-1.0)=area of the resonance at 1.2-1.0 ppm for polyether polyol A(1.6-1.52)=area of the resonance at 1.6 to 1.52 ppm for any octane-1,8-diol used (starter)

Taking account of the relative intensities, according to the following formula (IX), a conversion was made to mol % for the polymer-bound linear carbonate ("linear carbonate" LC) in the reaction mixture:

$$LC = \frac{A(5.1-4.8) - A(4.5)}{A(5.1-4.8) + A(2.4) + 0.33*A(1.2-1.0) + 0.25*A(1.6-1.52)} *100 \quad (IX)$$

The proportion by weight (in % by weight) of polymer-bound carbonate (LC') in the reaction mixture was calculated by formula (X):

$$LC' = \frac{[F(5,1-4,8) - F(4,5)]*102}{N} *100\% \quad (X)$$

where the value of D ("denominator" D) is calculated by formula (XI):

$$N=[F(5,1-4,8)-F(4,5)]*102+F(4,5)*102+F(2,4)*58+ \\ 0.33*F(1,2-1.0)*58+0.25*F(1.6-1.52)*146 \quad (XI)$$

The factor of 102 results from the sum total of the molar masses of $CO_2$ (molar mass 44 g/mol) and of propylene oxide (molar mass 58 g/mol); the factor of 58 results from the molar mass of propylene oxide and the factor of 146 results from the molar mass of any octane-1,8-diol starter used.

The proportion by weight (in % by weight) of cyclic carbonate (CC') in the reaction mixture was calculated by formula (XII):

$$CC' = \frac{A(4.5)*102}{D} *100\% \quad (XII)$$

where the value of D is calculated by formula (XI).

In order to use the values for the composition of the reaction mixture to calculate the composition based on the polymer component (composed of polyether polyol which has been formed from starter and polyether carbonate polyol which has been formed from starter, propylene oxide and carbon dioxide during the copolymerization), the nonpolymeric constituents of the reaction mixture (i.e. cyclic propylene carbonate and any unconverted propylene oxide present) were mathematically eliminated. The weight fraction of the repeat carbonate units in the polyether carbonate polyol was converted to a proportion by weight of carbon dioxide using the factor F=44/(44+58). The figure for the $CO_2$ content in the polyether carbonate polyol ("$CO_2$ incorporated"; see examples which follow) has been normalized to the proportion of the polyether carbonate polyol molecule that does not consist of the starter.

Raw Materials Used:

Polyether carbonate polyol: polyether carbonate polyol having an OH functionality=2.8, an OH number=56 mg KOH/g and a $CO_2$ content=21% by weight DMC catalyst: a dried and ground DMC catalyst (double metal cyanide catalyst) prepared according to example 6 of WO 2001/80994 A1

Glycerol: from Sigma Aldrich

Propylene glycol: from Sigma Aldrich

Example 1 (Comparative)

A continuously operated 60 L pressure reactor with gas metering unit and product discharge tube was initially charged with 32.9 L of a polyether carbonate polyol (OH functionality=2.8; OH number=56 mg KOH/g; $CO_2$ content=21% by weight) containing 200 ppm of DMC catalyst. At a temperature of 107° C. and a pressure of 74 bar (absolute), the following components were metered at the metering rates specified while stirring (7 Hz):
- propylene oxide at 6.4 kg/h
- carbon dioxide at 2.4 kg/h
- mixture of glycerol/propylene glycol (85% by weight/15% by weight) containing 0.66% by weight of DMC catalyst (unactivated) and 170 ppm (based on the starter mixture) of $H_3PO_4$ (in the form of an 85% aqueous solution) at 0.26 kg/h.

The reaction mixture was withdrawn continuously from the pressure reactor via the product discharge tube, such that the reaction volume (32.9 L) was kept constant. To complete the reaction, the reaction mixture was transferred into a postreactor (tubular reactor having reaction volume 2.0 L) which had been heated to 105° C. The product was subsequently expanded in a stirred tank (capacity 350 L). Finally, volatile constituents were removed by thin-film evaporation at a temperature of 140° C. and a pressure of 1 mbar (absolute) at a metering rate of about 9 kg/h.

Example 2 (Inventive)

The procedure was according to example 1 (comparative), except that the temperature of the heated postreactor was 120° C.

Example 3 (Inventive)

The procedure was according to example 1 (comparative), except that the temperature of the heated postreactor was 130° C.

Example 4 (Inventive)

The procedure was according to example 1 (comparative), except that the temperature of the heated postreactor was 140° C.

Subsequently, the content of incorporated carbon dioxide, the ratio of cyclic to linear carbonates and the OH number of the polyether carbonate polyols obtained according to experiments 1 to 4 were determined. The results are compiled in table 1 below:

TABLE 1

|  | Ex. 1 (comp.) | Ex. 2 (inv.) | Ex. 3 (inv.) | Ex. 4 (inv.) |
| --- | --- | --- | --- | --- |
| Temperature Postreactor [° C.] | 105 | 120 | 130 | 140 |
| Ratio of cyclic/linear carbonates | 0.177 | 0.170 | 0.172 | 0.179 |
| $CO_2$ content [% by wt.] | 20.0 | 20.0 | 19.7 | 19.6 |
| OH number [mg KOH/g] | 56.6 | 55.9 | 56.4 | 56.7 |

It is apparent from this that, in inventive examples 2 to 4, in spite of the distinct increase in reaction temperature, no significant change in the product properties can be detected. This relates particularly to the virtually unchanged selectivity expressed via the ratio of cyclic to linear carbonate.

The invention claimed is:

1. A process for preparing polyether carbonate polyols by adding one or more alkylene oxides and carbon dioxide onto one or more H-functional starter substances in the presence of at least one DMC catalyst, wherein the reaction is conducted in a main reactor and in a tubular reactor, wherein the tubular reactor is positioned downstream of the main reactor as a postreactor, wherein a reaction product flows from the main reactor into the tubular reactor, and wherein a temperature at the exit of the tubular reactor is set at least 10° C. above the temperature within the main reactor.

2. The process as claimed in claim 1, wherein a temperature at the exit of the tubular reactor is set at 10° C. to 40° C. above the temperature within the main reactor.

3. The process as claimed in claim 1, wherein the temperature at the exit of the tubular reactor is a function of a % by weight of unreacted alkylene oxide, based on the total weight of reaction mixture, measured at the entrance to the tubular reactor, and wherein the temperature at the exit of the tubular reactor is set at 2.5° C. to 12° C. per % by weight of unreacted alkylene oxide measured at the entrance to the tubular reactor above the temperature within the main reactor.

4. The process as claimed in claim 1, wherein the temperature at the exit of the tubular reactor is set by a heating unit.

5. The process as claimed in claim 1, wherein the reaction mixture is fed from the main reactor into the tubular reactor, and wherein the reaction mixture at the entrance to the tubular reactor has a content of unconverted alkylene oxides of 1% to 10% by weight, based on the total weight of reaction mixture.

6. The process as claimed in claim 1, wherein:
   (i) the DMC catalyst is suspended in one or more H-functional starter substances;
   (ii) the suspension from (i) is combined with one or more alkylene oxides and with 10 to 200 bar of carbon dioxide; and
   (iii) the mixture resulting from (ii) is reacted in the main reactor at a temperature of 80 to 150° C.,
   wherein the pressures set in the tubular reactor are essentially the same pressures as in the main reactor, and wherein:
   (iv) the suspension from (i) is first combined in a first mixer with one or more alkylene oxides and then in a second mixer with 10 to 200 bar of carbon dioxide.

7. The process as claimed in claim 1, wherein the DMC catalyst, the H-functional starter substance, the alkylene oxide, and the carbon dioxide are fed directly to the main reactor and reacted therein at a temperature of 90 to 135° C. and a reaction pressure of 20 to 180 bar, wherein the DMC catalyst is fed directly to the main reactor as a dispersion in the H-functional starter substance, the alkylene oxide, and the carbon dioxide.

8. The process as claimed in claim 1, wherein the internal diameter of at least a section of the tubular reactor is 1.1 mm to 900 mm.

9. The process as claimed in claim 1, wherein the tubular reactor is formed from a continuous piece of tube.

10. The process as claimed in claim 1, wherein the tubular reactor comprises a first subsection that extends over 20% to 60% of a total length of the tubular reactor, wherein the first subsection has an internal diameter of 1.1 mm to <100 mm, wherein the tubular reactor comprises a second subsection that follows downstream of the first subsection, wherein the second subsection extends over 80% to 40% of the total length of the tubular reactor, and wherein the second subsection has an internal diameter of 100 mm to 500 mm.

11. The process as claimed in claim 1, wherein the tubular reactor has a ratio of tube length L to internal tube diameter $d_R$ of $L/d_R > 50$.

12. The process as claimed in claim 1, wherein the main reactor is a continuously operated stirred reactor.

13. The process as claimed in claim 1, wherein the H-functional starter substance is selected from the group consisting of: polyether polyol, polyester polyol, polyether carbonate polyol, water, ethylene glycol, diethylene glycol, propylene glycol, dipropylene glycol, propane-1,3-diol, butane-1,4-diol, butene-1,4-diol, butyne-1,4-diol, neopentyl glycol, pentane-1,5-diol, 3-methylpentane-1,5-diol, hexane-1,6-diol, octane-1,8-diol, decane-1,10-diol, dodecane-1,12-diol, 1,4-bis(hydroxymethyl)cyclohexane, triethylene glycol, tetraethylene glycol, dipropylene glycol, tripropylene glycol, dibutylene glycol, trimethylolpropane, glycerol, trishydroxyethyl isocyanurate, castor oil, pentaerythritol, sorbitol, hexitol, sucrose, starch, starch hydrolyzate, cellulose, cellulose hydrolyzate, hydroxy-functionalized fats, hydroxy-functionalized oils, and combinations of any thereof.

14. An apparatus for preparing polyether carbonate polyols by adding one or more alkylene oxides and carbon dioxide onto one or more H-functional starter substances in the presence of at least one DMC catalyst, wherein the apparatus comprises a main reactor and a tubular reactor, wherein the tubular reactor is positioned downstream of the main reactor as a postreactor, wherein a reaction product flows from the main reactor into the tubular reactor, wherein a temperature at the exit of the tubular reactor is set at least 10° C. above the temperature within the main reactor, and wherein the temperature at the exit of the tubular reactor is set via a heating unit.

15. The apparatus as claimed in claim 14, wherein the exit of the tubular reactor comprises a temperature sensor, and wherein the temperature sensor is coupled to the heating unit for controlling the heating unit of the tubular reactor.

16. The process as claimed in claim 1, wherein the temperature at the exit of the tubular reactor is a function of a % by weight of unreacted alkylene oxide, based on the total weight of reaction mixture, measured at the entrance to the tubular reactor, and wherein the temperature at the exit of the tubular reactor is set 3° C. to 7° C. per % by weight of unreacted alkylene oxide measured at the entrance to the tubular reactor above the temperature within the main reactor.

17. The process as claimed in claim 1, wherein the temperature at the exit of the tubular reactor is set by an insulation of the tubular reactor.

18. The process as claimed in claim 1, wherein the reaction mixture is fed from the main reactor into the tubular reactor, and wherein the reaction mixture at the entrance to the tubular reactor has a content of unconverted alkylene oxides of 3% to 4% by weight, based on the total weight of reaction mixture.

19. The process as claimed in claim 1, wherein:
(i) the DMC catalyst is suspended in one or more H-functional starter substances;
(ii) the suspension from (i) is combined with one or more alkylene oxides and with 10 to 200 bar of carbon dioxide; and
(iii) the mixture resulting from (ii) is reacted in the main reactor at a temperature of 80 to 150° C.,
wherein the pressures set in the tubular reactor are essentially the same pressures as in the main reactor, and wherein:
(iv) the suspension from (i) is first combined in a first mixer with 10 to 200 bar of carbon dioxide and then in a second mixer with one or more alkylene oxides.

20. An apparatus for preparing polyether carbonate polyols by adding one or more alkylene oxides and carbon dioxide onto one or more H-functional starter substances in the presence of at least one DMC catalyst, wherein the apparatus comprises a main reactor and a tubular reactor, wherein the tubular reactor is positioned downstream of the main reactor as a postreactor, wherein a reaction product flows from the main reactor into the tubular reactor, wherein a temperature at the exit of the tubular reactor is set at least 10° C. above the temperature within the main reactor, wherein the temperature at the exit of the tubular reactor is set via an insulation of the tubular reactor.

* * * * *